United States Patent [19]

Skagerling

[11] Patent Number: 5,621,663
[45] Date of Patent: Apr. 15, 1997

[54] METHOD AND SYSTEM FOR MONITORING A COMPUTER SYSTEM

[75] Inventor: Lennart Skagerling, Sollentuna, Sweden

[73] Assignee: ICL Systems AB, Kista, Sweden

[21] Appl. No.: 428,472

[22] Filed: Apr. 26, 1995

Related U.S. Application Data

[63] Continuation of Ser. No. 170,193, filed as PCT/SE92/00456, Jun. 22, 1992, published as WO93/00632, Jan. 7, 1993, abandoned.

[30] Foreign Application Priority Data

Jun. 20, 1991 [SE] Sweden .................................. 9101942

[51] Int. Cl.$^6$ ........................................................ G06F 11/30
[52] U.S. Cl. ................ 364/550; 364/551.01; 395/184.01; 395/916
[58] Field of Search .............................. 364/550, 551.01; 395/180, 184.01, 575, 908, 916

[56] References Cited

U.S. PATENT DOCUMENTS

| | | | |
|---|---|---|---|
| 3,045,221 | 7/1962 | Roop | 364/550 X |
| 3,324,458 | 6/1967 | MacArthur | 395/575 |
| 3,344,408 | 9/1967 | Singer et al. | 395/575 |
| 3,351,910 | 11/1967 | Miller et al. | 395/575 |
| 3,491,340 | 1/1970 | Richman et al. | 395/575 |
| 3,540,003 | 11/1970 | Murphy | 395/575 |
| 3,575,589 | 4/1971 | Neema et al. | 371/7 |
| 3,906,454 | 9/1975 | Martin | 395/575 |
| 4,821,178 | 4/1989 | Levin et al. | 395/575 |
| 4,849,879 | 7/1989 | Chinnaswamy et al. | 395/916 X |
| 5,062,055 | 10/1991 | Chinnaswamy et al. | 395/551.01 |
| 5,129,043 | 7/1992 | Yue | 395/51 |
| 5,253,184 | 10/1993 | Kleinschnitz | 364/550 |
| 5,253,186 | 10/1993 | Lipner et al. | 364/550 |
| 5,261,044 | 11/1993 | Dev et al. | 395/159 |
| 5,317,725 | 5/1994 | Smith et al. | 395/575 |
| 5,329,465 | 7/1994 | Arcella et al. | 364/551.01 |
| 5,367,670 | 11/1994 | Ward et al | 395/575 |
| 5,444,642 | 8/1995 | Montgomery et al. | 364/550 |
| 5,487,148 | 1/1996 | Komori et al. | 395/182.02 |
| 5,537,539 | 7/1996 | Narihiro | 395/184.01 |

*Primary Examiner*—Edward R. Cosimano
*Attorney, Agent, or Firm*—Lee, Mann, Smith, McWilliams, Sweeney & Ohlson

[57] ABSTRACT

A method and system for monitoring and changing the operation of a computer system which comprises a local area network or interconnected local area networks, each having a plurality of computers. The system further comprises at least one event report generator in each executable program (4) whose execution should be monitored: an event processing machine (15) for processing events which are reported by an event report generator depending on a flexible rule base (16) which is included in the event processing machine and associates a certain event with a predetermined action, for determining the action associated with the reported event: equipment (18) controlled by the event processing machine and adapted to perform an action determined by the event processing machine: and an interface (13) for transferring an event reported by an event report generator to an event processing machine, and for transmitting a message regarding an action associated with the event, from the event processing machine to a program which is executable in the computer system, for changing or starting thereof.

15 Claims, 3 Drawing Sheets

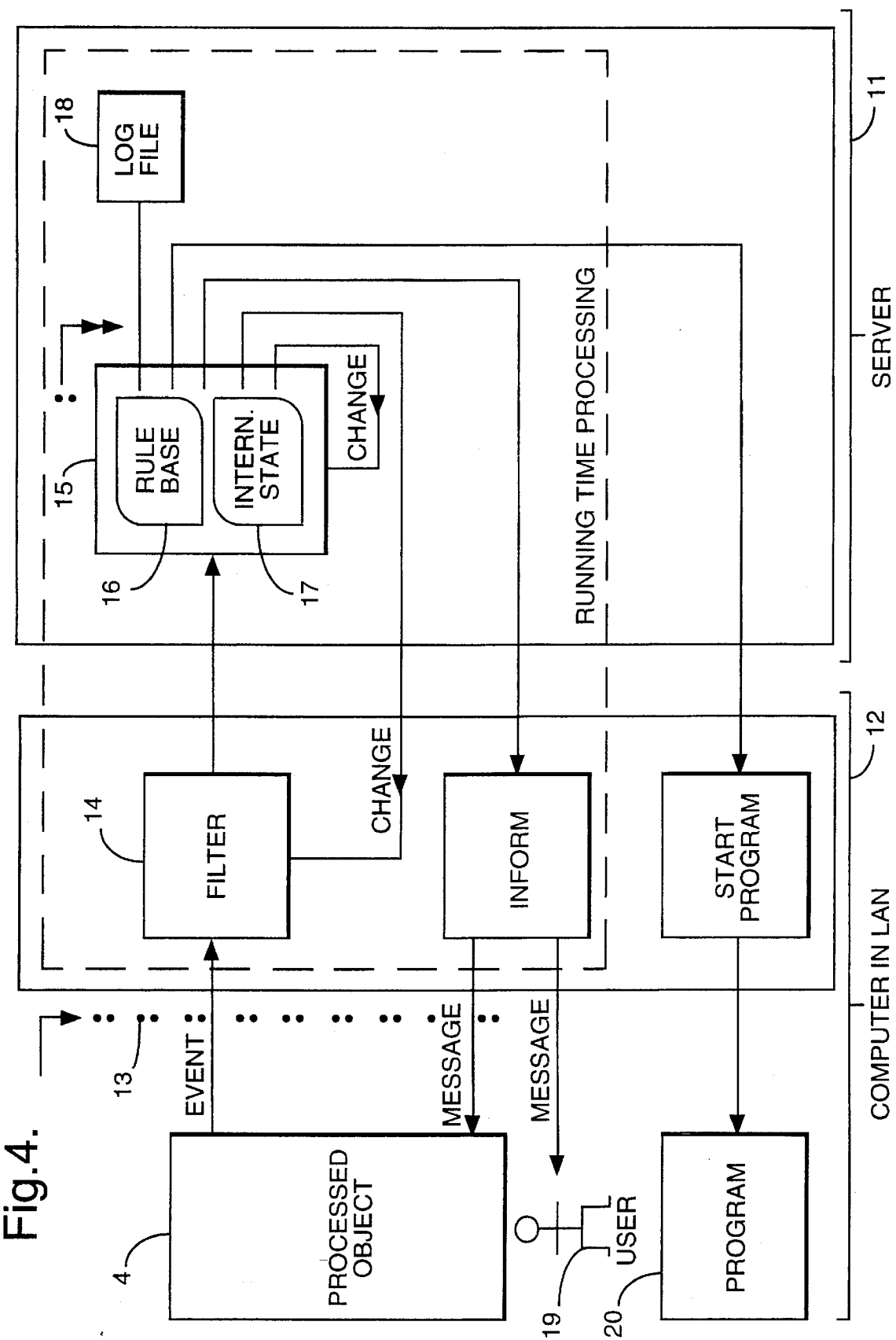

METHOD AND SYSTEM FOR MONITORING A COMPUTER SYSTEM

This is a continuation of Ser. No. 170,198, filed as PCT/SE92/00456 Jun. 22, 1992 and published as WO93/00632 Jan. 7, 1993, abandoned.

SUBJECT OF THE INVENTION

The invention relates to a method and a system for monitoring and changing the operation of a computer system which comprises a plurality of computers in a local area network or a plurality of interconnected local area networks, each having a plurality of computers.

BACKGROUND OF THE INVENTION

Equipment and programs which are intended for monitoring the operation of a computer or the execution of a program are previously known. However, they are specific for the computer concerned or the program concerned.

The object of the present invention is to provide a common instrument, i.e. a general method and a general system for such monitoring and changing of a computer system having a plurality of computers interconnected in at least one local area network. Such monitoring and changing may concern e.g. error processing, i.e. detecting, registering and rectifying errors occurring during the operation of a computer system; performance processing, i.e. detecting, registering and changing the performance of a computer system in operation; and utilisation processing, i.e. detecting, registering and changing the utilisation of different resources of the computer system, which are utilised by different users and programs.

SUMMARY OF THE INVENTION

In a system for monitoring and changing the operation of a computer system of the type mentioned by way of introduction, the object of the invention is achieved by the system comprising at least one event report generator in each program which is executable in the computer system and whose execution should be monitored; an event processing machine for processing events which are reported by an event report generator in a monitored program during the execution thereof, depending on a flexible rule base which is included in the event processing machine and associates a certain event with a predetermined action, for determining the action associated with the reported event; equipment controlled by the event processing machine and adapted to perform an action determined by the event processing machine; and an interface for transferring information about an event reported by an event report generator in a monitored program, to an event processing machine, and for transmitting a message regarding an action associated with the event, from the event processing machine, optionally via and for processing in a further event processing machine, to a program executable in said computer system and intended for changing or starting thereof.

Suitably, a filter is directly connected to the interface and adapted to restrict the number of the events reported which are forwarded to the event processing machine.

Moreover, the event processing machine suitably comprises an internal state device, said rule base being adapted to associate a certain event with a predetermined action which depends on the instantaneous state of the internal state device.

The equipment controlled by the event processing machine may also comprise means for registration of a reported event and/or for forwarding a reported event, optionally via and for processing in a further event processing machine, to an overriding part of the computer system.

The event processing machine can advantageously be adaptive by being arranged to change the internal state device and/or the rule base in response to reported event reports received by the event processing machine and/or in response to determined actions. Also the function of the filter may be changed in this manner.

The above-mentioned object of the invention is also achieved in a method for monitoring and optionally changing the operation of a computer system of the type mentioned by way of introduction, by the steps of incorporating at least one event report generator in each program which is executable in the computer system and whose execution should be monitored; determining, depending on a rule base which associates a certain event with a predetermined action, the action associated with a reported event; and performing the determined action at least in the form of transmitting a message to a program which is executable in the computer system, for changing or starting thereof.

To avoid overload in the utilisation of the rule base, the above-mentioned actions may suitably be determined merely for some of the reported events which are identical, with the exception of the time of reporting.

The action associated with a certain event can also be made dependent on parameters other than the event's own parameters. These other parameters may suitably be joined in a separate internal state device.

According to the invention, the method can be made adaptive by changing the rule base and/or said other parameters in response to reported events.

For example, the performed actions may also comprise registration of a reported event, and/or forwarding of a reported event to an overriding part of the computer system.

The event report generator which should be included in each program which is executable in the computer system and whose execution should be monitored, consists of program instructions included in the program in suitable positions which normally are determined by the programmer. The events which can be reported may be anything from a normal procedure that has been executed, to a serious error that has occurred. The reported event may for example concern the starting or stopping of something, or the occurrence of an error. This makes it possible to trace the program and see exactly what happens during the execution of the program.

The most interesting events are of course those concerning abnormal or critical situations and errors. Examples of events that could be reported are thus events for program sequencing, events concerning the fact that a certain change has been made in a computer memory, or that an operator or a program has requested a certain operation, that an error has been detected, that repeated access attempts have been made, and that the storage capacity of a disc is fully utilised. It may also be of interest to report events which may constitute data for statistics, e.g. different users' or different programs' utilisation of various resources in a computer system.

The report of an event must comprise an event identifier which need to be unique in the program concerned only, since before reaching the event processing machine, the event report is automatically supplemented with data regarding its source and the point of time of the generation. In addition to the identifier part, the event report may comprise a computer part containing data which are necessary for making a decision regarding a certain action, or for further processing of the event at issue. The computer part is suitably structured as one or more parameter identifiers and the associated parameter values.

Such programs as should be able to receive an action determined by the event processing machine in the form of a message to the program should of course be provided with program instructions for processing messages received. A determined action may of course consist of a number of subactions comprising a number of messages to different programs in different computers in the computer system. The messages may concern the program execution; for example, in case of a high load on a resource in the computer system, the program may be controlled to use this resource less frequently, or the program may be interrupted. The receipt of a message may in turn trigger an event report, whereby the determining of a certain action may be carried out in response to different events in different programs at different points of time.

The event processing machine, which normally is to be found in a server if there is one local area network, may be realised as software only or as a combination of software and hardware. The rule base in form of software included in the event processing machine comprises a set of rules having one condition part and one action part. The condition part preferably comprises a logical combination of a number of subconditions where the information contained in an event report makes it possible to determine whether one or more subconditions are satisfied. The information in the event report, which is useful for this purpose, may consist of information in the event identifier as well as information in the accompanying data, i.e. different parameter values. The satisfying of certain sub-conditions need, however, not be dependent on the information in a certain event report, but may instead be dependent on internal states in the event processing machine. These internal states are according to the invention represented in the internal state device in which the internal states may concern, for example, the count in different types of counters, the value of a state variable, or the value of a data set.

While taking into consideration that some events may occur at high rate, and that it is not always desirable that each occurrence of the events is received and processed by the event processing machine which then could be overloaded, use is according to the invention suitably made of a filter positioned before the event processing machine and adapted to determine for each separate event whether this should be forwarded to the event processing machine or not. This may be done by forwarding every nth event of a certain type. The filter is preferably made as software.

The equipment controlled by the event processing machine normally is a combination of software and hardware. The equipment may comprise e.g. memory means for registering the information or parts of the information in an event report. This form of information logging is of great value and allows postprocessing of registered information to produce statistics of various types, for example concerning the performance of the computer system, different users' utilisation of the system, programs in the system or resources included therein, as well as statistics regarding the occurrence of errors. The equipment also executes actions determined by the event processing machine such as transmitting a message to a program which is executable in the computer system, and starting such a program. Moreover, by means of an action determined by the event processing machine, the equipment can update the state device, change the rule base and also change the function of the filter. The equipment controlled by the event processing machine can also initiate an alarm and forward information, which is essential for the operation of the entire computer system, to an overriding part of the computer system.

DESCRIPTION OF THE DRAWINGS

An embodiment of the invention will now be described in more detail below with reference to the accompanying drawings. FIG. 4 is a schematic view of the configuration of a system according to the invention.

DESCRIPTION OF THE PREFERRED EMBODIMENTS

Figure 1:
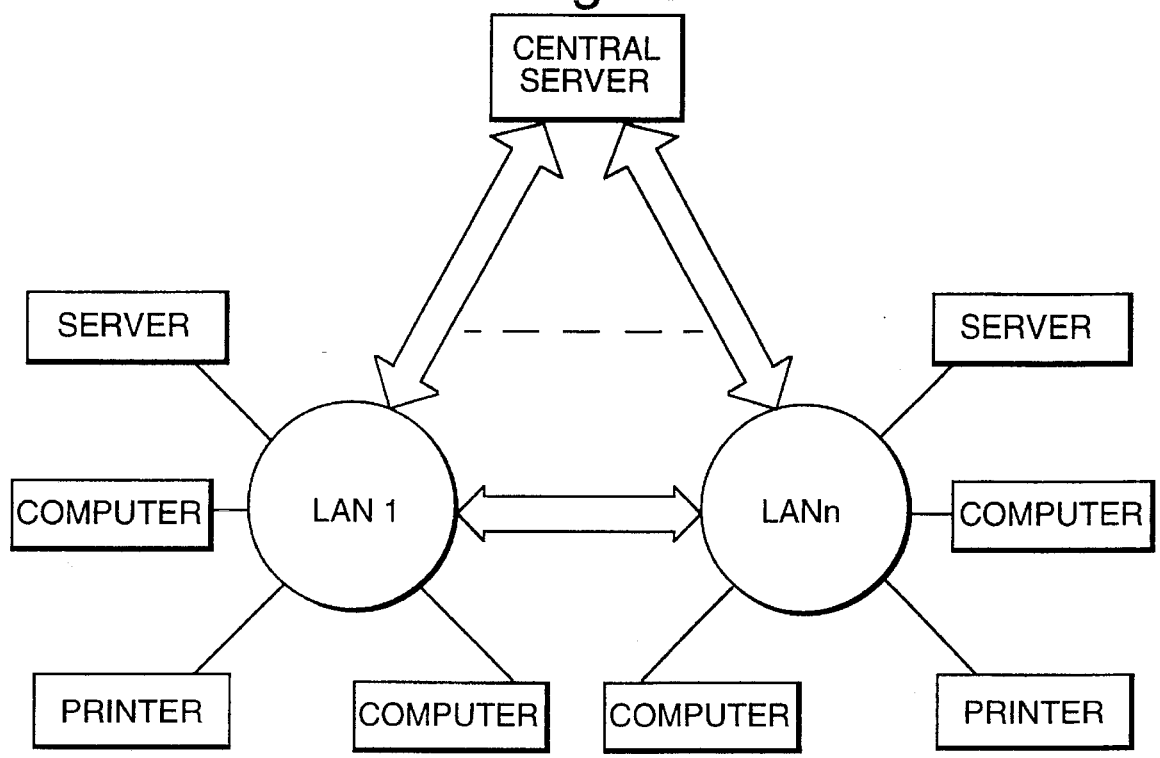
FIG. 1 is a schematic view of a conventional computer system.

The system according to the invention is preferably used in computer systems which may comprise a number of local area networks LAN1–LANn, as shown in FIG. 1, each local area network comprising a plurality of computers, a server and further equipment, e.g. printers, and the local area networks are being connected with each other and with an overriding part, in the form of e.g. a central server which preferably is physically included in one or some of the local area networks.

Figure 2:
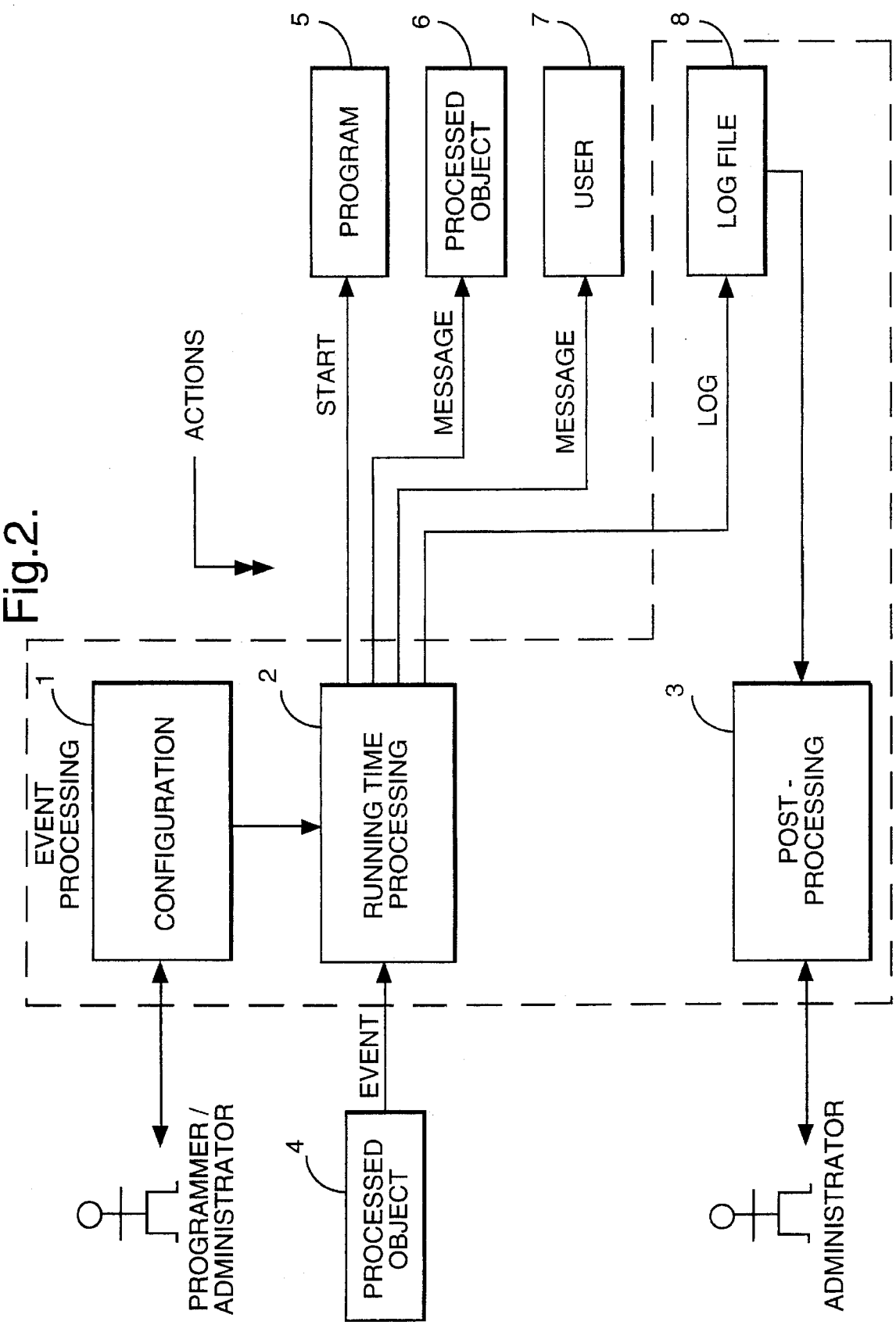
FIG. 2 is a schematic view illustrating the function of a system according to the present invention.

As shown in FIG. 2, the event processing according to the invention consists of three phases, viz. a configuration phase 1, a running time processing phase 2, and a postprocessing phase 3.

The configuration phase 1 comprises registration of processed objects, i.e. programs or certain equipment for the running of programs, events, to be registered, and, for these events, identifiers and attributes including parameters, as well as configuration of filters, rules and actions.

The running time processing phase 2 includes the actual processing of reported events on the basis of the previously executed configuration.

The third phase 3 implies postprocessing of the data which according to one type of action have been stored in a log file. Such postprocessing may for example concern the producing of statistics based on the information logged.

As indicated in FIG. 2, a program developer or administrator is required for the first phase 1, i.e. the configuration phase.

During the running time processing, an event is reported from a processed object 4 and triggers different types of actions, e.g. starting a program 5, transmitting a message to a processed object 6, transmitting a message to a user 7, or logging information in a log file 8 for subsequent postprocessing which can be performed by an administrator.

Figure 3:
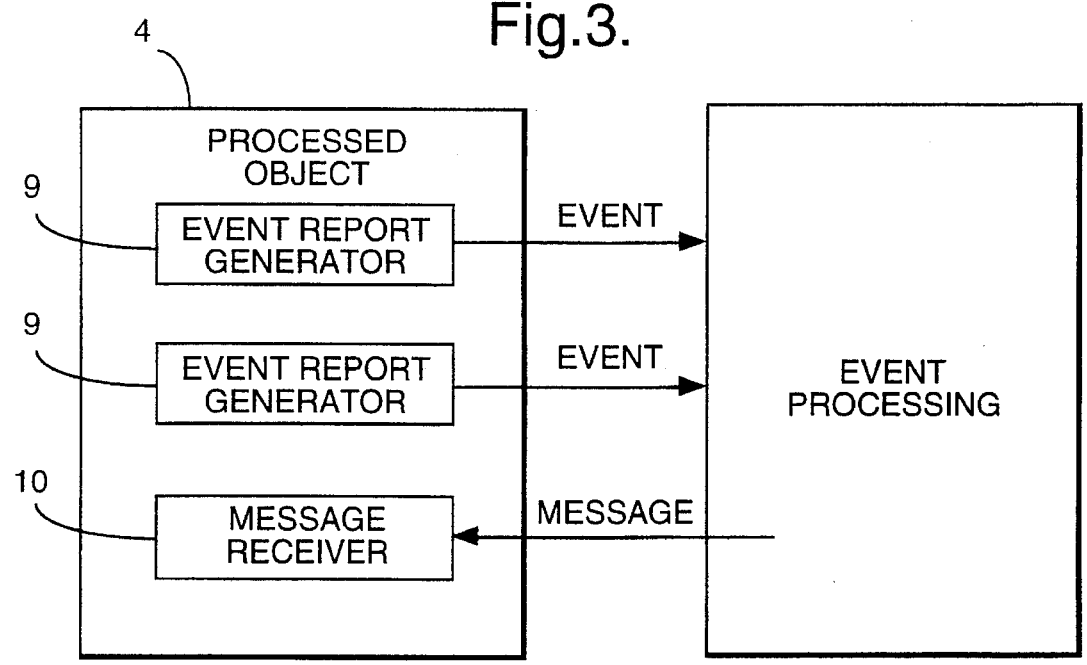
FIG. 3 illustrates in a simplified manner the contents of an object processed by the system according to the invention.

To be processable by means of the system according to the invention for monitoring and, optionally, changing the operation of a computer system, a processed object 4, i.e. normally a program executable in the system, should include at least one event report generator 9 which reports the occurrence of an event to the event processing system according to the invention (see FIG. 3). Some of the processed objects 4 should also have message receivers 10, i.e. predetermined instructions in an executable program, for receiving messages from the event processing system according to the invention.

The embodiment of the system according to the invention as illustrated in FIG. 4 concerns a local area network for which one server and only one computer are shown. The system comprises a server part 11 and a computer part 12. A program executable in the computer part 12, which constitutes a processed object 4, is adapted to report, by means of its event report generator 9 (shown in FIG. 3), an event via an interface 13 to a filter 14. The filter 14 is arranged to restrict the number of the reported events which are forwarded to an event processing machine 15 positioned in the server part 11. The event processing machine 15 comprises a rule base 16 and an internal state device 17. The event processing machine 15 processes reported events on the basis of the information included in the event report, the rule base 16 and, optionally, the instantaneous state of the state device 17 for determining different types of actions. These may comprise logging information in a log file 18, updating the event processing machine 15, i.e. its rule base 16 and/or its state device 17, changing the filter 14, transmitting a message to a processed object 4 or a user 19, or starting a program 20.

A processed object, such as the object 4, utilises the interface 13 for reporting events to the event processing machine 15 via the filter 14. Via the interface 13, the processed object 14 also receives messages from the event processing machine 15. When an event is reported via the interface 13 to the filter 14, it may either be disregarded, i.e. rejected, or forwarded to the event processing machine 15. This is determined by the filter 14 which is positioned immediately after the interface 13. Each event has its own appearance of the filter which is relatively simple and may be set to disregard a reported event, to forward all events of a certain type to the event processing machine, or to forward every nth event of a certain type to the event processing machine 15.

By this construction of the filter 14, the load of the event processing machine 15 will be reduced as will also the load of the network, such that the software itself, i.e. the processed object 4, will not be executed slowly owing to its transmitting event reports.

The event processing machine 15 is run in the server 11. Each event reported to the event processing machine from a processed object, i.e. such events as have been allowed to pass through the filter 14, is processed by the event processing machine 15 in conformity with the configuration thereof. This means that rules in a rule base will be applied to the event. Depending on the rules, the event can be logged, i.e. information in the event report may be registered, rejected, or some other predetermined action can be performed.

The rules in the event processing machine 15 which are collected in the rule base 16 have the following form:

if<condition>then<action>

The condition part may contain tests on the reporting computer, reporting programs, an event, the value of a certain counter, a state, the value of a variable etc. The condition part thus normally constitutes a logical combination of a number of subconditions, the satisfying of the individual subconditions being dependent on information in the event report and/or in the state device 17.

What is going to occur is described in the action part of the rule, if the condition is satisfied. For example, the action part may imply one or some of the following requests: logging the event and these parameters to a log file, transmitting a message (e.g. an alarm) to a user, sending a message to a program (processed object), starting a program, updating an internal counter, state variable or variable, changing a filter value for a certain event for a processed object, forwarding the event report to a higher level in the computer system.

It will be appreciated that in configurating the actual rule base, this will consist of a set of rules, the number of which will be very large. Since, for each event report received, the event processing machine 15 is essentially forced to go through every rule in the rule base 16 to determine whether a rule therein has been satisfied or not, and thus determine whether a certain action should be taken, obviously some sort of optimisation of the rule base is desirable. Such an optimisation may be achieved e.g. by analysing the rules of the rule base for determining such conditions, e.g. mutual subconditions in different rules, which allow the rules to be simplified and the number thereof to be reduced. A speeding-up of the event processing machine 15 operating with the rule base 16 can also be achieved by dividing the rules into a number of levels, i.e. only such events as satisfy a condition on a lower level will be tried against conditions on higher levels.

As is evident from what has been said above, the method and the system according to the invention for monitoring and, optionally, changing the operation of a computer system is an extremely powerful instrument. However, the invention is not limited to the embodiments described above, but a person skilled in the art will be able to modify the invention within the scope of the appended claims. For example, the event processing machine may be distributed such that it, or parts thereof, may be run in a server in an optional local area network, or even one or more of the computers included in the system.

I claim:

1. A system for monitoring and changing the operation of a computer system automatically, which computer system comprises at least one local area network including a plurality of computers and a server, wherein said monitoring and changing includes error processing, performance processing and utilisation processing, wherein a plurality of different programs are executable in the computer system and any particular computer can be executing a different program to one or more of the other computers at any particular point in time, and wherein the monitoring and changing system includes:

at least one event report generator in each said program of the plurality and whose execution is to be monitored, an event corresponding to the occurrence of a predetermined situation;

an event processing machine included in the server for processing events which are reported by the event report generators in the monitored programs during execution thereof in the computer system, depending on a respective rule base which is included in the event processing machine and associates certain events with predetermined actions, for determining the respective action associated with each reported event, all events occurring in the computer system computers being reportable to the event processing machine in the server;

equipment controlled by the event processing machine and adapted to perform actions determined by the event processing machine and an interface for transferring information about events reported by the event report generators in the monitored programs to the event processing machine, and for transmitting messages, regarding the respective actions associated with the events and determined by the rule base, from the event processing machine, optionally via and for processing in a further event processing machine of the computer system, to at least one of the group consisting of the respective monitored program of the plurality whose event report generator had reported the associated event and a program of the plurality other than the respective monitored program, an action message to the respective monitored program serving to change the operation of the respective monitored program and correspondingly to change the operation of the computer system, and an action message to the other program serving to start it automatically and correspondingly to change the operation of the computer system.

2. A system as claimed in claim 1, wherein the equipment also comprises means for registration of reported events and means for forwarding reported events to an overriding part of the computer system.

3. A system as claimed in claim 1, wherein the event processing machine included in the server is adapted to change the internal state device and the rule base and the filter in response to reported events received by the event processing machine included in the server and in response to determined actions.

4. A system as claimed in claim 1, wherein the equipment controlled by said event processing machine also comprises means for forwarding a reported event to an overriding part of the computer system.

5. A system as claimed in claim 1, wherein the said event processing machine is adapted to change the rule base in response to reported events received by said event processing machine.

6. A system as claimed in claim 1, and including a filter directly connected to said interface and adapted to restrict the number of events reported which are forwarded to the event processing machine included in the server.

7. A system as claimed in claim 6, wherein the said event processing machine is adapted to change the filter in response to reported events received by said event processing machine.

8. A system as claimed in claim 1, wherein the event processing machine included in the server comprises an internal state device, and the rule base is adapted to associate a certain event with a predetermined action which depends on the instantaneous state of the internal state device.

9. A system as claimed in claim 8, wherein the said event processing machine is adapted to change the internal state device in response to reported events received by said event processing machine.

10. A method for monitoring and changing the operation of a computer system automatically, which computer system comprises at least one local area network including a plurality of computers and a server, wherein said monitoring and changing includes error processing, performance processing and utilisation processing, and wherein a plurality of different programs are executable in the computer system and any particular computer can be executing a different program to one or more of the other computers at any particular point in time, and including the steps:

incorporating at least one event report generator in each said program of the plurality and whose execution is to be monitored, an event corresponding to the occurrence of a predetermined situation;

operating the computer system by executing at least one said program whose execution is to be monitored in the computer system;

detecting reported events associated with the executed programs;

determining, in an event processing machine included in the server and depending on a rule base which associates certain events with predetermined actions, the respective action associated with each detected reported event, all events occurring in the computer system computers being reportable to the event processing machine in the server;

and performing each determined action at least in the form of transmitting a respective message to at least one of the group consisting of the respective monitored program of the plurality whose event report generator had reported the associated event and a program of the plurality other than the respective monitored program, a message transmitted to the respective monitored program serving to change the operation of the respective monitored program and correspondingly to change the operation of the computer system, and a message transmitted to the other program serving to start the other program automatically and correspondingly to change the operation of the computer system.

11. A method as claimed in claim 10, wherein the respective action is determined merely for some of the reported events which are identical, with the exception of the time of reporting.

12. A method as claimed in claim 10, wherein the actions which can be performed also comprise registration of a reported event to an overriding part of the computer system.

13. A method as claimed in claim 10, wherein the rule base is caused to change in response to reported events.

14. A method as claimed in claim 10, wherein the action associated with a certain event is also made dependent on parameters other than the event's own parameters.

15. A method as claimed in claim 14, wherein said other parameters are caused to change in response to reported events.

* * * * *